US008689079B2

(12) United States Patent
Masuo et al.

(10) Patent No.: US 8,689,079 B2
(45) Date of Patent: Apr. 1, 2014

(54) MEMORY DEVICE HAVING MULTIPLE CHANNELS AND METHOD FOR ACCESSING MEMORY IN THE SAME

(75) Inventors: Yoko Masuo, Iruma (JP); Taichiro Yamanaka, Hino (JP); Hironobu Miyamoto, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 158 days.

(21) Appl. No.: 13/333,345

(22) Filed: Dec. 21, 2011

(65) Prior Publication Data

US 2012/0221921 A1 Aug. 30, 2012

(30) Foreign Application Priority Data

Feb. 25, 2011 (JP) .................................. 2011-040470

(51) Int. Cl.
*H03M 13/00* (2006.01)

(52) U.S. Cl.
USPC ................... 714/763; 365/185.09; 365/185.33

(58) Field of Classification Search
USPC .......................... 714/763; 365/185.09, 185.33
See application file for complete search history.

(56) References Cited

U.S. PATENT DOCUMENTS

| 7,483,329 | B2 * | 1/2009 | Luo et al. ..................... 365/226 |
| 7,579,683 | B1 * | 8/2009 | Falik et al. ..................... 257/690 |
| 7,617,352 | B2 | 11/2009 | Mukaida et al. |
| 7,788,427 | B1 * | 8/2010 | Yang .............................. 710/62 |
| 7,852,690 | B2 * | 12/2010 | Cornwell et al. .......... 365/189.2 |
| 7,904,639 | B2 * | 3/2011 | Kim et al. ..................... 711/103 |
| 8,291,295 | B2 * | 10/2012 | Harari et al. .................. 714/763 |
| 8,443,263 | B2 * | 5/2013 | Selinger et al. ............... 714/768 |
| 2003/0126406 | A1 * | 7/2003 | Hammarlund et al. ....... 712/200 |
| 2003/0196025 | A1 * | 10/2003 | Dahlen et al. ................ 711/103 |
| 2006/0152981 | A1 | 7/2006 | Ryu |
| 2009/0241010 | A1 | 9/2009 | Yano et al. |
| 2010/0106901 | A1 * | 4/2010 | Higeta et al. ................. 711/106 |
| 2012/0158205 | A1 * | 6/2012 | Hinman et al. ............... 700/297 |

FOREIGN PATENT DOCUMENTS

| JP | 2006-195990 | 7/2006 |
| JP | 2009-211230 | 9/2009 |
| WO | WO 02-052416 | 7/2002 |

OTHER PUBLICATIONS

Suzuye & Suzuye, Information Sheet for Preparing an Information Disclosure Statement Under Rule 1.56, undated.

* cited by examiner

*Primary Examiner* — Esaw Abraham
(74) *Attorney, Agent, or Firm* — Knobbe, Martens, Olson & Bear, LLP

(57) ABSTRACT

According to one embodiment, a command generator sequentially and speculatively issues channel-by-channel access commands to a memory interface in a predetermined access process. A purger returns a series of unexecuted already-issued access commands using a purge response if an error occurs in any of memory accesses via a plurality of channels. A command progress manager updates command progress information such that the command progress on each of the plurality of channels returns to a position specified in an oldest access command of a series of the returned access commands issued to the channel. The command generator issues the channel-by-channel access commands including the oldest access command to the memory interface based on the updated command progress information.

10 Claims, 6 Drawing Sheets

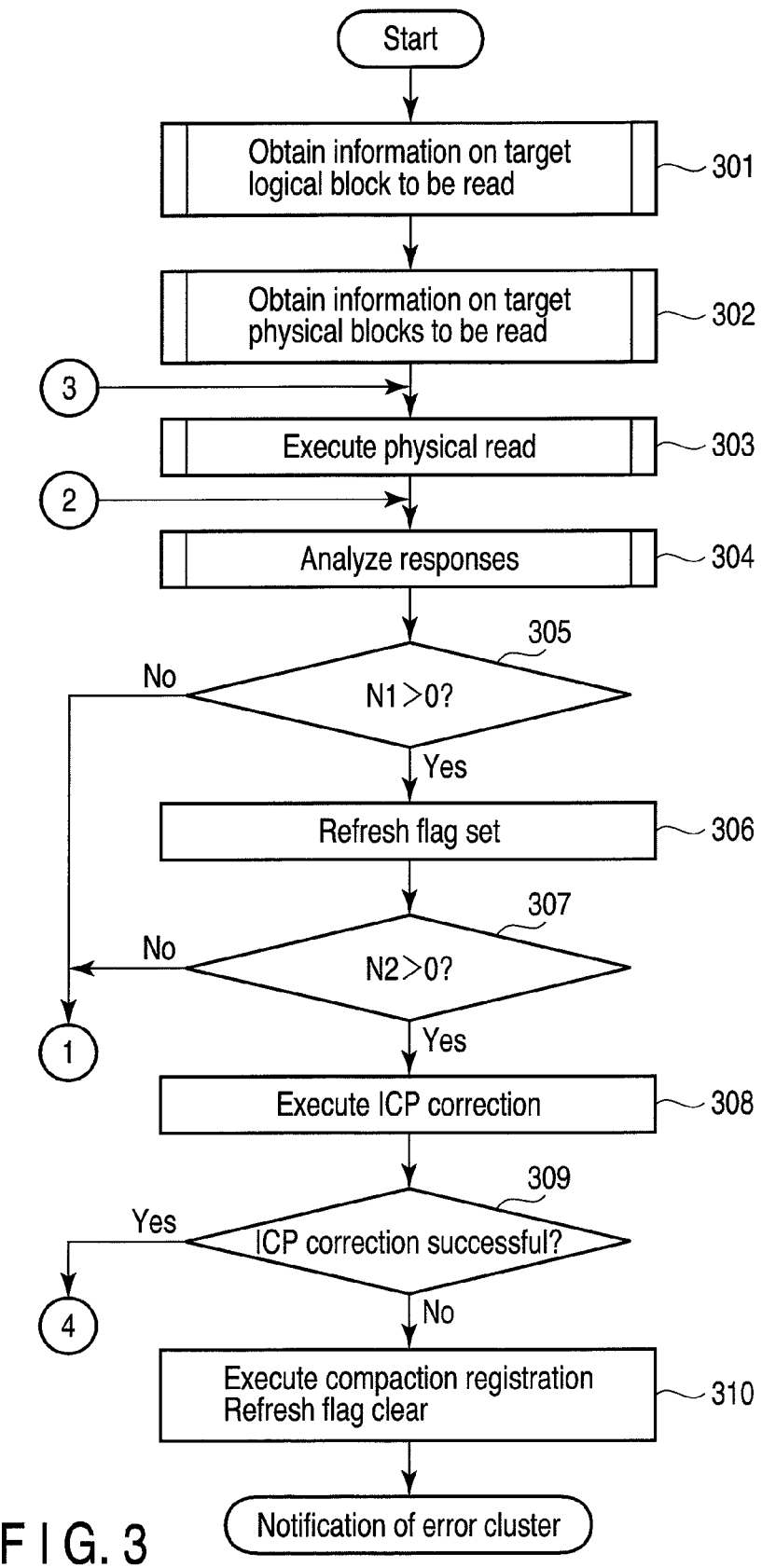
F I G. 3

MEMORY DEVICE HAVING MULTIPLE CHANNELS AND METHOD FOR ACCESSING MEMORY IN THE SAME

CROSS-REFERENCE TO RELATED APPLICATIONS

This application is based upon and claims the benefit of priority from prior Japanese Patent Application No. 2011-040470, filed Feb. 25, 2011, the entire contents of which are incorporated herein by reference.

FIELD

Embodiments described herein relate generally to a memory device having multiple channels and a method for accessing a memory in the memory device.

BACKGROUND

Memory devices have been known which comprise a memory typified by a NAND flash memory and which have multiple channels on which a plurality of access commands are executed in parallel. However, flash memories such as NAND flash memories are known to have a relatively low data retention capacity. Thus, the quality of data stored in a flash memory may, for example, be degraded over time.

Hence, in a conventional memory device comprising a flash memory, a monitoring process (hereinafter referred to as a patrol process) is executed to appropriately check for degradation of data remaining stored in the flash memory for a long time without being used. The patrol process involves read accesses and is executed, for example, in units of blocks by a memory controller. If degradation of data (degradation of quality of the data) is detected, the data in the corresponding block is rewritten to another block in the flash memory. This allows the data in the block with degradation of the data quality detected therein to be refreshed.

In the patrol process, a plurality of access commands (read commands) are speculatively issued in order to gain efficient read access to the entire area of a block to be checked (monitored). That is, succeeding access commands are issued before preceding access commands are completely executed. Thus, the memory controller is configured to record all the issued commands in order to deal with a possible error in read accesses executed in accordance with the access commands. This is not limited to the patrol process. Recording of all the access commands is also executed in, for example, a self-diagnostic process in which the memory device itself diagnoses the data (user data) stored in the flash memory in accordance with a request from a host. The recording is also executed in a refresh process in which degradation of data in peripheral pages resulting from repeated reads is detected to allow the peripheral pages to be refreshed.

Power to a memory device having a flash memory may be lost while the data in a block in the flash memory is being rewritten. In this case, the rewriting may fail to complete normally. Thus, memory devices are also known which are configured such that when the data in a block in the flash memory is to be rewritten, information indicating the progress of the rewriting (rewrite progress information) is recorded. When the memory device is powered on again, the data in the block in which the rewrite failed to complete normally is recovered based on the information on the progress of the rewrite recorded at the time of the power shutdown.

As described above, the conventional memory device having a flash memory is configured to record all the access commands speculatively issued in the read/write process (memory access process) intended for the entire area of a block. Thus, the conventional memory device requires a memory area (that is a management area) in which all the access commands are recorded. This also applies to memory devices having memories other than the flash memory provided that the memory devices execute a plurality of speculatively issued access commands in parallel.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is a part of a flowchart illustrating the procedure of the self-diagnostic process applied in the embodiment;

DETAILED DESCRIPTION

Various embodiments will be described hereinafter with reference to the accompanying drawings. In general, according to one embodiment, a memory device comprises a memory, a memory interface, a command generator, a purger and a command progress manager. The memory is configured to be accessed via a plurality of channels. The memory interface is configured to access the memory via the plurality of channels in parallel based on a plurality of access commands. The command generator is configured to sequentially and speculatively issue channel-by-channel access commands to the memory interface in a predetermined access process for accessing the memory in units of blocks. The purger is configured to return a series of unexecuted already-issued access commands using a purge response if an error occurs in any of memory accesses via the plurality of channels which are executed by the memory interface. The command progress manager is configured to manage command progress in the access commands in the predetermined process based on command progress information and to update the command progress information such that the command progress on each of the plurality of channels returns to a position specified in an oldest access command of a series of the returned access commands issued to the channel. The command generator is further configured to issue the channel-by-channel access commands including the oldest access command to the memory interface based on the updated command progress information.

Figure 1:
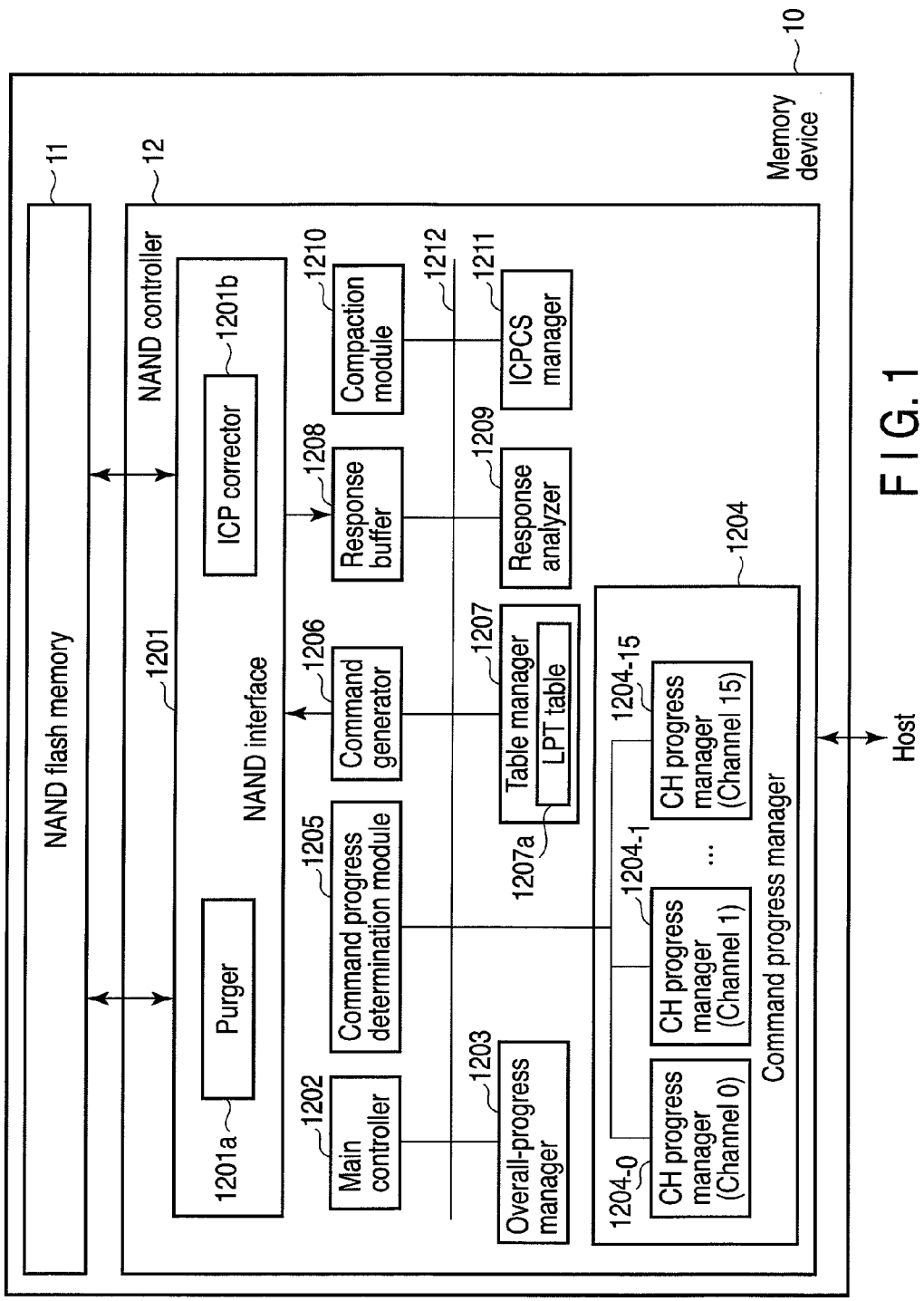
FIG. 1 is a block diagram showing an exemplary configuration of a memory device having multiple channels according to an embodiment.

FIG. 1 is a block diagram showing an exemplary configuration of a memory device having multiple channels according to an embodiment. In the embodiment, a memory device 10 shown in FIG. 1 is connected to, for example, a host (not shown in the drawings). The host utilizes the memory device 10 as its storage device.

The memory device 10 comprises a NAND flash memory 11 and a NAND controller 12. The NAND flash memory 11 is a storage medium in which user data is stored. The NAND flash memory 11 comprises a plurality of NAND flash memory chips, and is configured to be accessible to the NAND controller 12 in accordance with a plurality of access commands in parallel. Instead of the NAND flash memory 11, a memory other than the NAND flash memory may be used provided that parallel accesses to the memory can be gained in accordance with a plurality of access commands.

The NAND controller 12 accesses the NAND flash memory 11 in accordance with a request from the host. The NAND controller 12 accesses the NAND flash memory 11 in order to execute, in units of blocks, a memory access process such as a self-diagnostic process, a patrol process, or a refresh process. Here, it is assumed that a self-diagnostic process is executed.

The NAND controller 12 comprises a NAND interface 1201, a main controller 1202, an overall-progress manager 1203, a command progress manager 1204, a command progress determination module 1205, a command generator 1206, a table manager 1207, a response buffer 1208, a response analyzer 1209, a compaction module 1210, and an interchannel parity correction state (ICPCS) manager 1211. An internal bus 1212 interconnects the modules including the main controller 1202, the overall-progress manager 1203, the command progress manager 1204, the command progress determination module 1205, the command generator 1206, the table manager 1207, the response buffer 1208, the response analyzer 1209, the compaction module 1210, and the ICPCS manager 1211.

The NAND interface 1201 transmits information between the NAND flash memory 11 and each of the command generator 1206 and the response buffer 1208. The NAND interface 1201 comprises a purger 1201a and an interchannel parity (ICP) corrector 1201b.

If an error occurs in execution of issued access commands, the purger 1201a returns all unexecuted access commands to the response buffer 1208 using a special command response (hereinafter referred to as a purge response). If an uncorrectable error occurs even by use of an error correction code (ECC), the ICP corrector 1201b corrects the error based on interchannel data. This correction is referred to as interchannel parity correction or interchannel error correction.

The main controller 1202 controls the operation of each of the above-described modules, to which the main controller 1202 is connected via the internal bus 1211. The overall-progress manager 1203 manages the progress of commands for each process unit (each self-diagnostic process). The overall-progress manager 1203 integrally manages the state of the progress of commands on each channel (that is, the state of the channel-by-channel command progress) managed by the command progress manager 1204 to determine the end of each process unit (for example, whether one logical block has been completely processed).

The command progress manager 1204 manages the progress of access commands (that is, the progress of issuance of the access commands) in an access process executed on each channel in units of logical blocks (here, an access process for a self-diagnostic process). The access commands are speculatively issued to the NAND interface 1201 on each channel in order to process one logical block. The command progress manager 1204 holds command progress information used to manage the progress of issuance of the access commands on each channel (hereinafter referred to as the command progress). Channel-by-channel command progress information is stored in an area in a memory such as a DRAM.

The channel-by-channel command progress information comprises (a page number, a plane number, and a cluster number). More specifically, the channel-by-channel command progress information comprises (a page number and a plane-cluster number). The channel-by-channel command progress information indicates a relative position (a page, a plane, and a cluster) in a physical block specified in an access command to be issued to a corresponding channel (or the latest command issued). That is, the channel-by-channel command progress information indicates a command progress position. The channel-by-channel command progress information also indicates a channel-by-channel relative position in a logical block to which the specified physical block is assigned. The relative position is hereinafter simply referred to as a position. The page number, the plane number, the cluster number, and the plane-cluster number, as well as the page, the plane, and the cluster will be described below.

In the embodiment, the NAND interface 1201 comprises 16 channels 0, 1, . . . , 14, and 15 as described below in detail. Thus, the command progress manager 1204 comprises channel-by-channel command progress managers 1204-0, 1204-1, . . . , 1204-14, and 1204-15 corresponding to the respective 16 channels 0, 1, . . . , 14, and 15. Channel-by-channel command progress managers 1204-0, 1204-1, . . . , 1204-14, and 1204-15 are hereinafter referred to as channel progress managers (CH progress managers) 1204-0, 1204-1, . . . , 1204-14, and 1204-15. Channel progress manager 1204-i (i=0, 1, . . . , 14, and 15) manages the progress of access commands issued to channel i, and holds command progress information (page number and plane-cluster number) corresponding to channel i.

The command progress determination module 1205 identifies the oldest position (page, plane, and cluster) on each channel based on command responses described below. The command progress determination module 1205 then determines whether the command process needs to be updated based on the identified position. The oldest position refers to the position specified in the oldest access command in a series of unexecuted access commands issued to the corresponding channel.

The command generator 1206 speculatively issues a plurality of access commands for accesses to the NAND flash memory 11, to the NAND interface 1201 on each channel. The command generator 1206 issues the access commands on each channel based on the channel-by-channel command progress information managed by the command progress manager 1204.

The table manager 1207 comprises a logical-to-physical address translation (LPT) table 1207a used to convert a logical address into a physical address. In the embodiment, the LPT table 1207a is constructed in an area in a memory such as a DRAM. When, for example, a self-diagnostic process is executed, the table manager 1207 converts the address (logical address) of a logical block to be processed into the address (physical address) of a corresponding physical block based on the LPT table 1207a. The logical address of the logical block to be processed can be identified based on a logical block ID used to identify the logical block and command progress information (page number and plane-cluster number). The table manager 1207 also holds, for each logical block (logical block ID), information indicating the state of the corresponding logical block (the information is hereinafter referred to as logical block information). The logical block information includes information indicating whether the corresponding logical block is a logical block in use (that is, an active logical block).

The response buffer 1208 is configured to store responses (hereinafter referred to as command responses) from the NAND interface 1201 to access commands issued to the NAND interface 1201 by the command generator 1206. Those of the command responses which provide notification of errors are sometimes referred to error responses. The above-described purge responses are also stored in the response buffer 1208 as command responses.

The response buffer 1208 has a FIFO structure constructed using, for example, a FIFO buffer. The response buffer 1208 is managed by a write pointer and a read pointer. The write pointer indicates a position in the response buffer 1208 at which a command response returned by the NAND interface is to be stored. The read pointer indicates a position in the response buffer 1208 at which the next command response to be analyzed by the response analyzer 1209 is stored.

The response analyzer 1209 analyzes one of the command responses stored in the response buffer 1208 after being returned by the NAND interface 1201 which is pointed to by the read pointer. Upon finishing analyzing the command response pointed to by the read pointer, the response analyzer 1209 advances the read pointer so that the read pointer points to the next position in the response buffer 1208.

The compaction module 1210 executes a compaction process if a self-diagnostic process determines that the data in a logical block needs to be migrated to another block. That is, the compaction module 1210 executes a compaction process if the logical block ID of a target logical block for the compaction process is registered. The compaction process rewrites the data in first physical blocks in the NAND flash memory 11 which are currently assigned to the logical block indicated by the logical block ID, to other, second physical blocks in the NAND flash memory 11. After the data rewrite, the physical blocks assigned to the logical block indicated by the logical block ID are changed from the first physical blocks to the second physical blocks.

The ICPCS manager 1211 manages a logical page (here, any one of logical pages 0 to 63) in the logical block indicated by the logical block ID and on which ICP correction has been executed. In the embodiment, the ICPCS manager 1211 manageably determines whether or not ICP correction has been completed on logical pages 0 to 63, based on a bitmap with a length of 64 bits (hereinafter referred to as an ICP completion page bitmap). The ICP completion page bitmap is stored in an area in a memory such as a DRAM.

Now, the operation of the memory device 10 according to the embodiment will be described taking the self-diagnostic process as an example. First, in the embodiment, it is assumed that the memory device 10 is operating under the following prerequisites (1 to 6).

(1) The command generator 1206 can simultaneously issue a plurality of access commands to the NAND interface 1201. The maximum number of access commands that can be simultaneously issued to the NAND interface 1201 by the command generator 1206 is set when the memory device 10 is started. In the embodiment, the NAND interface 1201 includes 16 channels 0, 1, . . . , and 15 and the command generator 1206 can simultaneously issue access commands for up to 16 channels. Channels 0, 1, . . . , and 15 have channel numbers 0, 1, . . , and 15, respectively (decimal notation).

(2) One logical block comprises 64 pages (logical pages) 0, 1, . . . , and 63. Accesses (here, read accesses) are executed in units of clusters each corresponding to a half of a page. That is, separate accesses are made to a cluster 0 and to a cluster 1. The pages 0, 1, . . . , and 63 have page numbers 0, 1, . . . , and 63, respectively (decimal notation). The clusters 0 and 1 have cluster numbers 0 and 1, respectively (decimal notation).

(3) Each of channels 0, 1, . . . , and 15 is connected to two planes 0 and 1. An access process (here, a read process) via each channel is executed four times (2 [planes]×2 [clusters]) per page.

(4) Access commands (here, read commands) are ensured to be executed on each channel in the same order in which the access commands have been issued.

(5) If an error occurs on a channel i, all the unexecuted commands are purged.

(6) Errors that cannot be corrected using ECCs are corrected by the ICP corrector 1201*b*.

Figure 2:
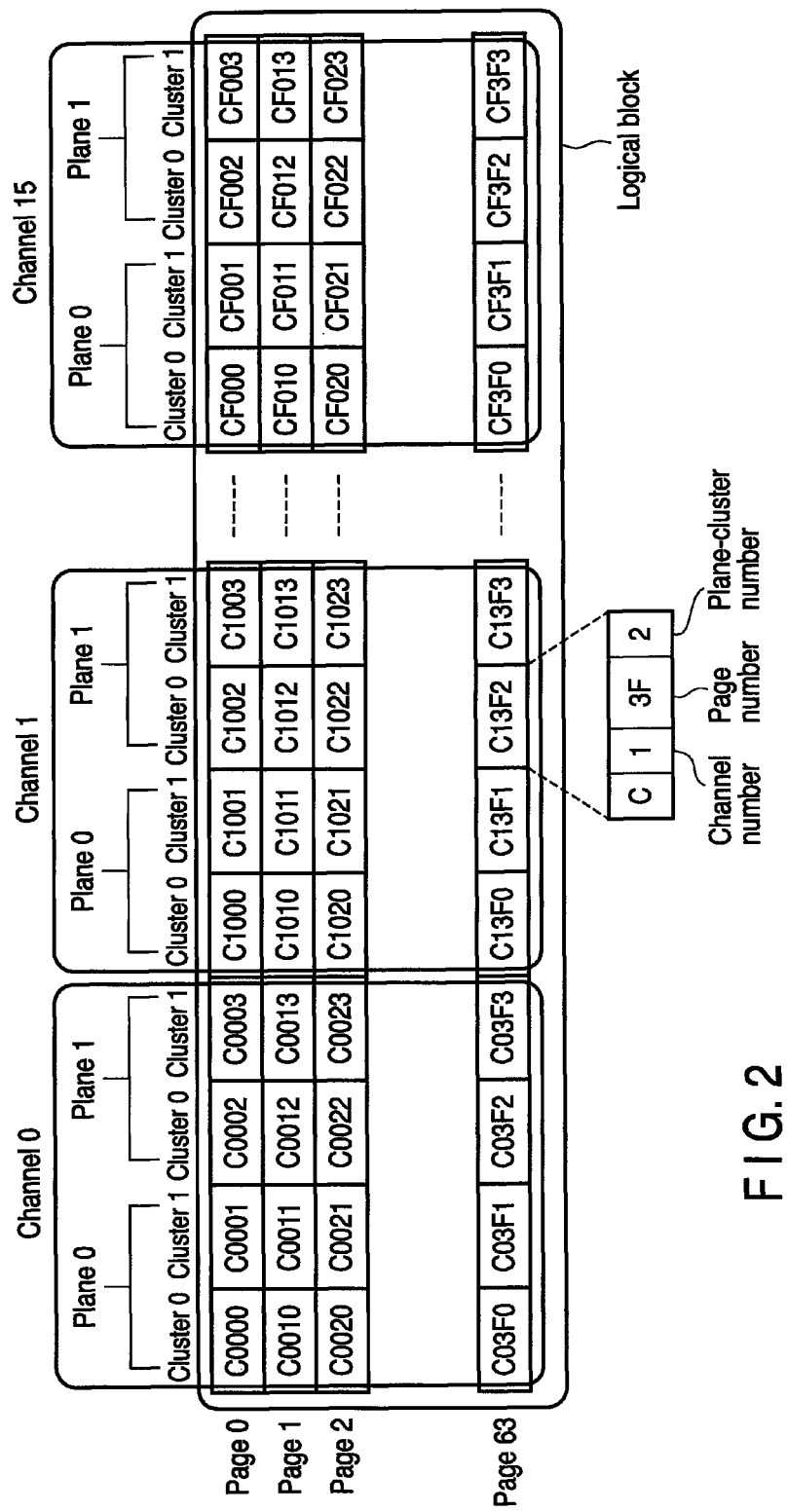
FIG. 2 is a diagram showing an example of 4,096 access commands generated when a self-diagnostic process is executed on one logical block according to the embodiment, in association with pages, channels, and clusters.

FIG. 2 shows 4,096 (64×16×4) access commands C0000, C0001, C0002, C0003, C1000, C1001, C1001, C1002, C1003, . . , CF3F0, CF3F1, CF3F2, and CF3F3 generated when the self-diagnostic process is executed on one target logical block under the prerequisites, in association with pages 0, 1, . . . , and 63, channels 0, 1, . . . , and 15, planes 0 and 1, and clusters 0 and 1. In the example illustrated in FIG. 2, the 32 physical blocks are assigned to the one logical block. The 32 physical blocks correspond to planes 0 and 1 on each of the 16 channels 0, . . . , and 15.

In an access command Cpqrs, C denotes an access command, and p (0, 1, . . . , or F) corresponds to a one-digit hexadecimal number indicating the channel number of the channel on which the access command Cpqrs is issued. Furthermore, qr (00, 01, . . . , or 3F) corresponds to a two-digit hexadecimal number indicating the page number of the accessed page.

In the access command Cpqrs, s (0, 1, 2, or 3) corresponds to a one-digit hexadecimal number indicating a plane-cluster number specifying a combination of a plane and a cluster in the channel on which the access command Cpqrs is issued. s=0 indicates a combination of plane 0 and cluster 0, and s=1 indicates a combination of plane 0 and cluster 1. s=2 indicates a combination of plane 1 and cluster 0, and s=3 indicates a combination of plane 1 and cluster 1. Thus, s (0, 1, 2, or 3), that is, the plane-cluster number, is equivalent to indication of the plane number (0 or 1) of the plane and the cluster number (0 or 1) of the cluster.

In the embodiment, the pages in the logical block are accessed in order of the pages 0, 1, . . . , and 63 on each channel. However, the progress of accesses to the page varies depending on the channel. Furthermore, four access commands Cpqr0, Cpqr1, Cpqr2, and Cpqr3 containing an instruction to access the page qr (qr corresponds to a two-digit number in hexadecimal notation) via channel p (p corresponds to a number in hexadecimal notation) of the NAND flash memory 11 are executed in order of this sequence.

Specifically, four access commands C0000, C0001, C0002, and C0003 containing an instruction to access the page 0 (0 is a number in decimal notation) via, for example, channel 0 (0 is a number in decimal notation) of the NAND flash memory 11 are executed in order of this sequence. Furthermore, four access commands CF000, CF001, CF002, and CF003 containing an instruction to access the page 0 via, for example, channel 15 (which corresponds to F in hexadecimal notation) of the NAND flash memory 11 are executed in order of this sequence. Similarly, four access commands C03F0, C03F1, C03F2, and C03F3 containing an instruction to access the page 63 (which corresponds to 3F in hexadecimal number) via, for example, channel 0 of the NAND flash memory 11 are executed in order of this sequence. Likewise, four access commands CF3F0, CF3F1, CF3F2, and CF3F3 containing an instruction to access the page 63 (which corresponds to 3F in hexadecimal number) via, for example, channel 15 (which corresponds to F in hexadecimal number) of the NAND flash memory 11 are executed in order of this sequence.

Now, the procedure of the self-diagnostic process applied in the embodiment will be described in brief taking, as an example, a self-diagnostic process using one logical block as a target. The target logical block for the self-diagnostic process is also a target for a read access. Thus, the target logical block for the self-diagnostic process is hereinafter sometimes referred to as a target logical block to be read. Furthermore, the target logical block to be read is hereinafter sometimes simply referred to as a target logical block.

1) The NAND controller 12 reads, for each channel, all the clusters contained in the target logical block to be read. The NAND controller 12 thus determines whether the data in the corresponding clusters is normal.

2) Upon detecting a valid cluster for which errors cannot be corrected, the NAND controller 12 determines whether or not ICP correction can be achieved on the cluster. If the ICP correction cannot be achieved on the cluster, the NAND controller 12 ends the self-diagnostic process for the target logical block. The NAND controller 12 then notifies the requestor for the self-diagnostic process of the error cluster.

3) If in 2) described above, the ICP correction can be achieved on the cluster, the NAND controller 12 returns to 1) described above to read the succeeding clusters.

4) If one or more clusters for which errors cannot be corrected have been detected when the processing of the target logical block is finished, the NAND controller 12 registers the target logical block as a target for the compaction process.

Figure 4:
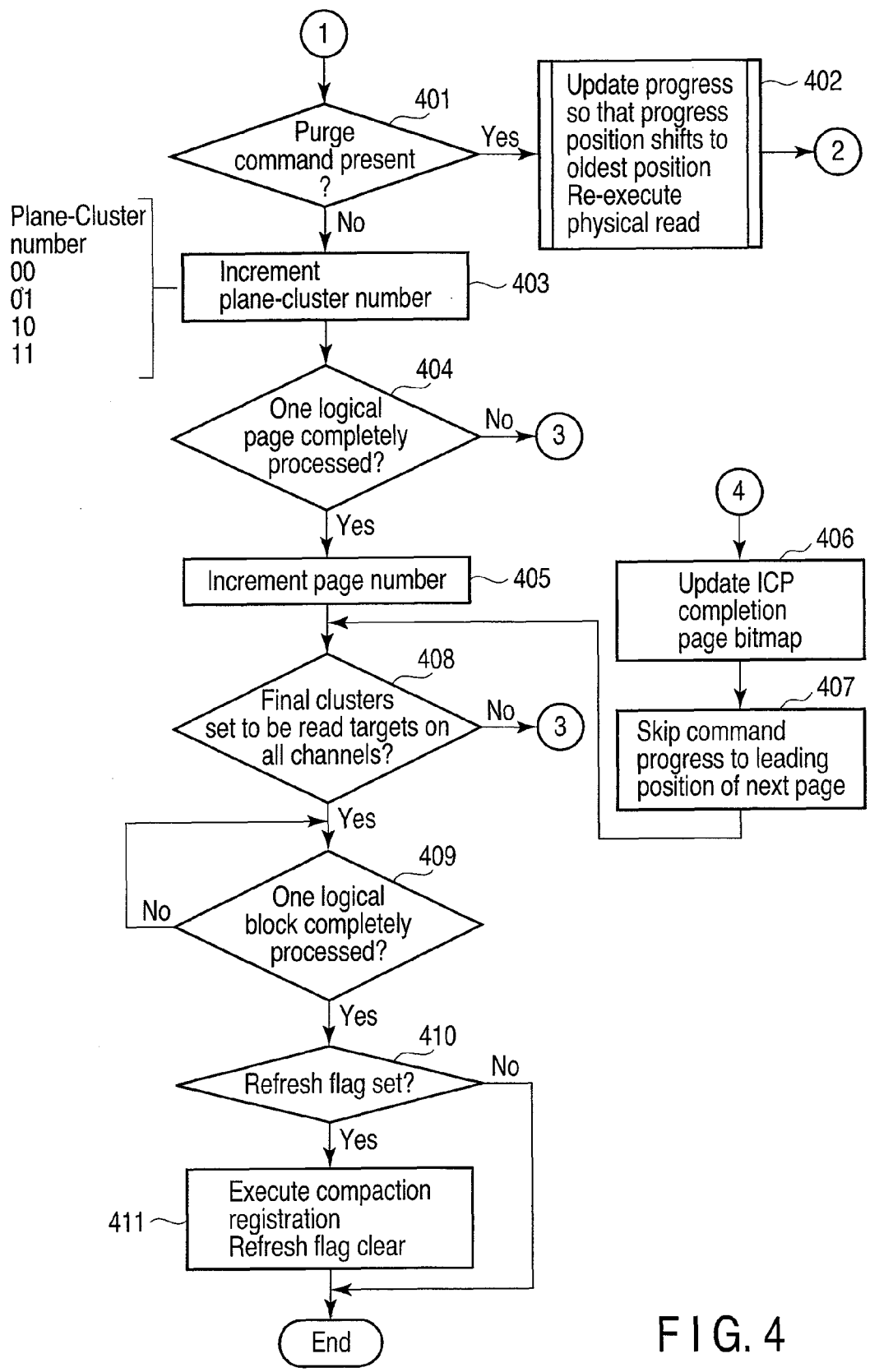
FIG. 4 is the remaining part of the flowchart illustrating the procedure of the self-diagnostic process applied in the embodiment.

Now, the procedure of the above-described self-diagnostic process will be described with reference to a flowchart in FIG. 3 and FIG. 4. It is assumed that the host requests the NAND controller 12 of the memory device 10 in FIG. 1 to execute a self-diagnostic process. In the embodiment, the self-diagnostic process is executed as a background process for the access process requested by the host. That is, the self-diagnostic process is executed utilizing a free time during the access process requested by the host. The self-diagnostic process illustrated in the flowchart in FIG. 3 and FIG. 4 is targeted for one logical block. Thus, when a plurality of logical blocks are self-diagnosed, the self-diagnostic process illustrated in the flowchart in FIG. 3 and FIG. 4 is repeated such that the repetitions are equal to the logical blocks to be diagnosed in number.

The main controller 1202 of the NAND controller 12 indicates, to the command progress manager 1204, a target logical block for the self-diagnostic process (that is, the target logical block to be read). This indication uses, for example, the logical block ID of the target logical block to be read. At the beginning of the self-diagnostic process, command progress information for each of channels 0, 1, . . . , 14, and 15 held by the command progress manager 1204 is initialized to "000" so as to indicate an initial position (page 0, plane 0, and cluster 0), though this operation is omitted in the flowchart in FIG. 3 and FIG. 4.

If the target logical block to be read is indicated by the main controller 1202, the command progress manager 1204 obtains logical block information on the target logical block from the table manager 1207 (block 301). Here, it is assumed that the logical block information obtained indicates that the target logical block is not an active logical block. In this case, the target logical block need not be read (more specifically, the self-diagnostic process need not be executed). Thus, the main controller 1202 ends the self-diagnostic process for the current target logical block, though this operation is omitted in the flowchart in FIG. 3 and FIG. 4.

In contrast, it is assumed that the logical block information obtained indicates that the target logical block is an active logical block. In this case, the command progress manager 1204 references the LPT table 1207a based on the logical block ID of the target logical block. Thus, the command progress manager 1204 obtains information (physical block information) on the target physical blocks to be read which blocks are assigned to the target logical block (block 302). The physical block information includes the IDs (physical block IDs) of the corresponding physical blocks (target physical blocks to be read).

Then, the command progress manager 1204 obtains a physical address indicating which physical position of the NAND flash memory 11 is to be accessed on each channel based on the physical block IDs in the physical block information obtained in block 302 and the current channel-by-channel command progress information (page number and plane-cluster number) held by the command progress manager 1204 (block 303). If the physical block information obtained in block 302. indicates that the corresponding block is a null block, the command progress manager 1204 updates the current command progress information for the corresponding channel so that the information indicates the next position. That is, the command progress manager 1204 advances the command progress (page, plane, and cluster) on the corresponding channel to the next position. The command progress manager 1204 then obtains the physical address of the physical block to be accessed via the corresponding channel (target physical block to be read) according to a procedure similar to that described above.

Figure 6:
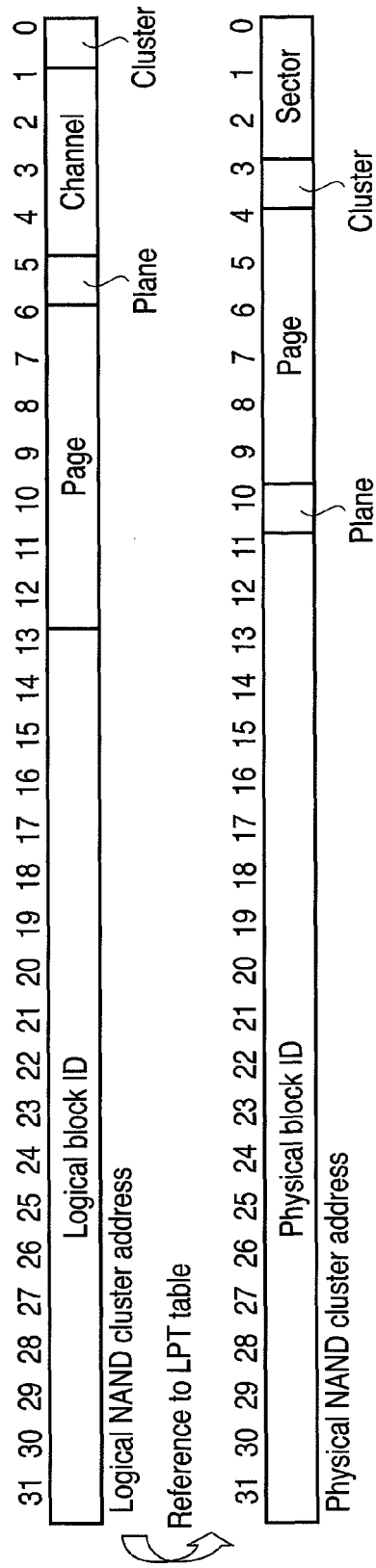
FIG. 6 is a diagram showing examples of formats of a logical address and a physical address applied in the embodiment.

FIG. 6 shows examples of the formats of the logical address and physical address applied in the embodiment. The logical address comprises the logical block ID of the corresponding logical block, a page number, a plane number, a channel number, and a cluster number. In the embodiment using the NAND flash memory 11 in the memory device 10, the logical address is also referred to as a logical NAND cluster address. The physical address comprises the physical block ID used to identify the corresponding physical block, a plane number, a page number, a cluster number, and a sector number. The physical address is also referred to as a physical NAND cluster address.

In block 303, the overall-progress manager 1203 determines, for each channel, whether the command progress has advanced to the final cluster in the target logical block (more specifically, the final cluster in the final page), based on the state of the channel-by-channel command progress managed by the command progress manager 1204. The overall-progress manager 1203 holds the determination result for each of the above-described channels. In block 303, the command generator 1206 generates an access command (hereinafter referred to as a read command) specifying a read access to the corresponding physical position (page, plane, and cluster) on each channel, based on the physical address (that is, the physical NAND cluster address) obtained by the command progress manager 1204. The read command generated contains a NAND cluster address in the format shown in FIG. 6. The read access based on the read command is referred to as a physical read.

The command generator 1206 further sets particular specification information in one of the read commands generated for each channel which meets a predetermined condition. The read command meeting the particular condition refers to a read command corresponding to the physical NAND cluster address determined by the overall-progress manager 1203 to be undergoing a final cluster process (that is, the read command is the final read command). The particular specification information set therein specifies that a command response (success response) be returned if the corresponding final read command is successfully executed. That is, a read command with the particular specification information set therein specifies that a command response be returned if the read command is successfully executed (that is, the corresponding physical read is successfully executed). On the other hand, read commands with the particular information not set therein (that is, non-final read commands) implicitly specify that no command response be returned if the read command is successfully executed. Furthermore, each read command implicitly specifies that a command response (error response) be returned regardless of whether the particular information is set therein, if the read command fails to be executed. The read commands (non-final read commands) not meeting the particular condition may contain set specification information explicitly specifying that that no command response be returned if the read command is successfully executed.

Figure 5:
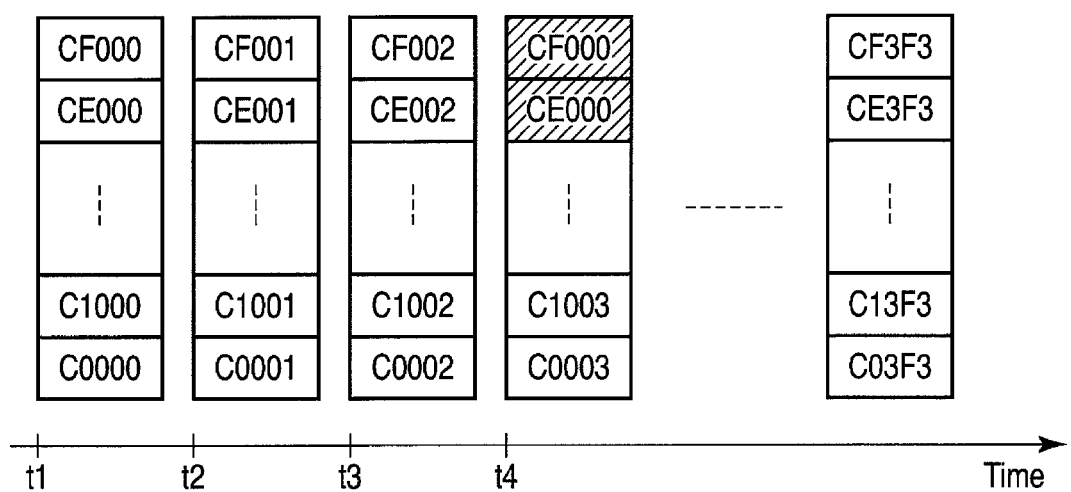
FIG. 5 is diagram showing an example of a time series of read commands sequentially issued by a command generator according to the embodiment.

In block 303, the command generator 1206 simultaneously issues up to 16 generated read commands to the NAND interface 1201. As in this example, in the first block 303 in accordance with the flowchart in FIG. 3 and FIG. 4, the 16 read commands C0000, C1000, . . . , CE000, and CF000 corresponding to the 16 channels 0, 1, . . . , 14, and 15, respectively, are simultaneously issued. FIG. 5 shows an example of a time series of read commands sequentially issued by the command generator 1206. In the example illustrated in FIG. 5, the 16 read commands C0000, C1000, . . . , CE000, and CF000 are shown to be issued at time t1.

The read commands C0000, C1000, . . . , CE000, and CF000 simultaneously issued to the NAND interface 1201 by the command generator 1206 are stored in a command queue (not shown in the drawings) in the NAND interface 1201. If the command queue is not full, the command generator 1206 can speculatively issue subsequent read commands to the NAND interface 1201. In the embodiment, it is assumed that 16 read commands C0001, C1001, . . . , CE001, and CF001 are issued at time t2 subsequent to time t1 and that 16 read commands C0002, C1002, . . . , CE002, and CF002 are issued at later time t3. In this manner, the command generator 1206 can speculatively issue subsequent read commands until the command queue becomes full.

At the beginning of the self-diagnostic process, the NAND interface 1201 takes out the 16 read commands C0000, C1000, . . . , CE000, and CF000 initially stored in the command queue. Then, based on the taken-out read commands C0000, C1000, . . . , CE000, and CF000, the NAND interface 1201 accesses the NAND flash memory 11 via plane 0 connected to the corresponding channels 0, 1, . . . , 14, and 15 in parallel.

Here, it is assumed that an error occurs in one of the read accesses based on the read commands. In the embodiment, the error is detected based on ECC added to the read data and thus referred to as an ECC error.

If an ECC error occurs, the NAND interface 1201 returns an error response to the response buffer 1208 as a command response to the read command specifying the read access with the ECC error occurring therein. The error response (command response) returned to the response buffer 1208 is stored in the response buffer 1208.

Furthermore, if an ECC error occurs, the purger 1201*a* of the NAND interface 1201 returns, to the response buffer 1208, all the commands stored in the command queue corresponding to each of the channels including the one with the ECC error occurring (that is, all the unexecuted read commands issued to each of the channels including the one with the ECC error occurring), using a purge response. The purge response (command response) returned to the response buffer 1208 is stored in the response buffer 1208.

As described above, the self-diagnostic process is executed in the background of the system. Thus, on some channels, access commands for an access requested by the host may be executed in preference to read commands for the self-diagnostic process. In the embodiment, the purger 1201*a* of the NAND interface 1201 returns all the unexecuted commands to the response buffer 1208 using a purge response even if an ECC error occurs in the access requested by the host.

It is assumed that the NAND interface 1201 returns a command response, which is then stored in the response buffer 1208. The response analyzer 1209 all the command responses stored in an area starting from a position in the response buffer 1208 which is pointed to by the read pointer (block 304).

Based on the analysis result for the command responses, the response analyzer 1209 determines whether the analysis result involves one or more error responses (ECC error responses) notifying the host of an ECC error (block 305). If the analysis result involves one or more error responses, that is, if the number N1 of ECC errors exceeds zero (N1>0) (Yes in block 305), the response analyzer sets a refresh flag (block 306). The refresh flag is used to indicate an instruction to register a logical block as a target for the compaction process at the end of the self-diagnostic process for the logical block.

Then, the response analyzer 1209 inquires to the table manager 1207 whether or not the cluster determined in block 305 to be undergoing an ECC error is valid. The valid cluster refers to a cluster in which valid data is stored. If the data stored in the valid cluster is migrated to another cluster, the valid cluster becomes invalid. The validity/invalidity of clusters is managed by the table manager 1207.

Based on the result of the inquiry to the table manager 1207, the response analyzer 1209 determines whether the number N2 of valid clusters determined to be undergoing an ECC error (that is, the number N2 of ECC errors in the valid clusters) exceeds zero (block 307). If the number N2 of ECC errors in the valid clusters exceeds zero (N2>0) (Yes in block 307), the self-diagnostic process proceeds to block 308. In block 308, the main controller 1202 allows the ICP corrector 1201*b* to execute ICP correction on pages (logical pages) containing the valid clusters determined to be undergoing an ECC error (that is, the valid clusters on which ECC correction cannot be achieved).

In the embodiment, for each logical page in the logical block, one of the 16 channels is allocated to storage of error correction data for ICP correction in order to enable the ICP correction of the corresponding page. The channel allocated to the storage of the error correction data is changed for each logical page. However, a particular channel may be allocated to the storage of the error correction data. The error correction data for the ICP correction is, for example, parity data (interchannel parity) generated based on the data in the corresponding logical pages stored in the other 15 channels. The ICP corrector 1201*b* uses the parity data to execute the ICP correction for correcting an error location in logical page j (j=qr) containing a valid cluster on which the ECC correction cannot be achieved. That is, the ICP corrector 1201*b* executes the ICP correction based on the parity data and the data in logical page j. The data in logical page j is corresponds to 14 channels (the second channels) which are included among the other 15 channels and which are other than the one (first channel) with the valid cluster on which the ECC correction cannot be performed.

Based on the result of the ICP correction executed by the ICP corrector 1201*b*, the main controller 1202 determines whether the ICP correction of logical page j has been successful (block 309). If the ICP correction of logical page j fails, that is, if the ICP correction cannot be achieved on logical page j (No in block 309), the main controller 1202 registers the logical block ID of the target logical block in the compaction module 1210 as a target logical block for the compaction process (block 310). This registration is referred to as compaction registration. In block 310, the main controller 1202 clears the refresh flag.

Then, the main controller 1202 notifies the requestor for the self-diagnostic process (here, the host) of the cluster on which the ICP correction cannot be achieved. The main controller 1202 then ends the self-diagnostic process for one logical block. In this case, the compaction module 1210 executes the compaction process for migrating the data in the logical block indicated by the logical block ID registered in block 310, to another block.

On the other hand, if the analysis result from the response analyzer 1209 contains no error response, that is, if the number N1 of ECC errors is zero (No in block 305), the self-diagnostic process proceeds to block 401. The self-diagnostic process also proceeds to block 401 if the number N2 of ECC errors in the valid clusters is zero (No in block 307).

In block 401, the command progress determination module 1205 determines whether the command responses analyzed by the response analyzer 1209 include a purge response (whether any purge response is present among the command responses). That is, the command progress determination module 1205 determines whether the analyzed command responses include one or more commands returned using a purge response (the command is referred to as a purge command).

Here, it is assumed that on channels 14 and 15, since the access process requested by the host has been preferentially executed, the read commands CE000 and CF000, included in the read commands C0000, C1000, . . . , CE000, and CF000 simultaneously issued to channels 0, 1, . . . , 14, and 15, respectively, at time t1, are unexecuted even after time t2. It is also assumed that a purge response is returned to the host because an error has occurred in the access process requested by the host and executed via channels 14 and 15. The returned purge response contains the read commands CE000, CE001, CE002, CF000, CF001, and CF002 as purge commands (Yes in block 401).

In this case, channel progress manager 1204-14 of the command progress manager 1204 and channel progress manager 1204-15 of the command progress manager 1204 update the command progress information for channels 14 and 15 held by channel progress mangers 1204-14 and 1204-15, respectively, as described below; channel progress manager 1204-14 corresponds to channel 14 to which the read commands CE000, CE001, and CE002 have been issued, and channel progress manager 1204-15 corresponds to channel 15 to which the read commands CF000, CF001, and CF002 have been issued. That is, channel progress manager 1204-14 and channel progress manager 1204-15 update the command progress information (page number and plane-cluster number) for channels 14 and 15 so that the information indicates the oldest position (block 402). The oldest positions corresponding to channels 14 and 15 are the positions (page 0, plane 0, and cluster 0) corresponding to the oldest purge commands (unexecuted read commands) CE000 and CF000.

In this case, the command progress information for channels 14 and 15 is updated to "000".

Furthermore, in block 402, the channel progress managers (other channel progress managers) in the command progress manager 1204 other than channel progress managers 1204-14 and 1204-15 update the command progress information held by the other channel progress managers so that the information indicates the next position. Here, as is apparent from FIG. 5, the above-described other channel progress managers update the command progress information to "003" so that the information indicates (page 0, plane 1, and cluster 1). Furthermore, in block 402, as in the case of block 303 described above, the command progress manger 1204 obtains physical NAND cluster address for each channel based on the physical block IDs obtained in block 302 and the current channel-by-channel command progress information.

In block 402, as in the case of block 303 described above, the command generator 1206 generates up to 16 read commands specifying read accesses to positions (pages, planes, and clusters) indicated by the physical NAND cluster addresses obtained for the respective channels by the command progress manager 1204. In block 402, the command generator 1206 simultaneously issues the up to 16 generated read commands to the NAND interface 1201. In the example illustrated in FIG. 5, the 16 read commands C0003, C1003, . . . , CE000, and CF000 are issued at time t4. When block 402 ends, the self-diagnostic process returns to block 304 described above.

Now, it is assumed that the analyzed command responses include no purge command (No in block 401). In this case, the command progress manager 1204 increments the plane-cluster number s in the command progress information for channels 0 to 15 held by the command progress manager 1204 (block 403). That is, the command progress manager 1204 shifts the command progress to the next position. In block 403, if the plane-cluster number s is 3 before the update, the plane-cluster number s is set to 0. The plane-cluster number s is updated in order of 0, 1, 2, 3, and 0.

Then, based on the updated command progress information for channels 0 to 15, the command progress manger 1204 determines, for each channel, whether the one logical page has been completely processed (more specifically, whether the one logical page has been completely self-diagnosed) (block 404). Here, if the plane-cluster number s in the command progress information for channel i is 0, the command progress manager 1204 determines that the one logical page has been completely processed (more specifically, all the clusters in the one logical page corresponding to channel i have been completely processed).

If the one logical page has not been completely processed on any channels (No in block 404), the self-diagnostic process returns to block 303. In block 303, the overall-progress manager 1203 determines whether the position indicated by the channel-by-channel command progress information corresponds to the final cluster in the final page as a result of the execution of block 403. The overall-progress manager 1203 holds the determination result for each channel.

In contrast, if the one logical page has been completely processed on any channel, for example, channel i (Yes in block 404), the self-diagnostic process proceeds to block 405. In block 405, the command progress manager 1204 increments the page number in the command progress information for channel i on which the one logical page has been completely processed. That is, the command progress manager 1204 advances the command progress on channel i to the next logical page. Here, since the plane-cluster number s is set to 0 in the last block 403, the command progress on channel i updated in block 405 corresponds to the leading cluster in the next logical page. When block 405 ends, the self-diagnostic process proceeds to block 408.

Now, the successful ICP correction of logical page j (Yes in block 309) will be described. It is assumed that the ICP correction has been executed because of an ECC error in an access attempted in accordance with a read command issued to channel i. In this case, the ICPCS manager 1211 updates the ICP completion page bitmap so that the bitmap indicates the completion of ICP correction of logical page j (block 406). Here, a bit j in the 64-bit ICP completion page bitmap which corresponds to logical page j is set to 1 (on). The successful ICP correction of logical page j is equivalent to the normal termination of self-diagnosis of logical page j on all of channels 0 to 15.

Thus, if the ICP completion page bitmap is updated (block 406), the command progress manager 1204 advances the command progress at least on channel i to the leading cluster in a logical page j+1 following logical page j on which the ICP correction has been successfully executed (block 407). That is, the command progress manager 1204 skips logical page j in connection with the command progress at least on channel i. In block 407, for the command progresses on the remaining channels, the command progress manager 1204 also advances the command progress indicating that logical page j is in process, to the leading cluster in logical page j+1. When block 407 ends, the self-diagnostic process proceeds to block 408 as in the case where block 405 ends.

In block 408, the overall-progress manager 1203 determines whether the command progress has advanced to the final clusters in the target logical block on all channels 0 to 15, based on the information held for each channel by the overall-progress manager 1203. That is, the overall-progress manager 1203 determines whether the corresponding final clusters in the target logical block are set to be a read target on all channels 0 to 15. If the final cluster fails to be set to a read target on any of the channels (No in block 408), the self-diagnostic process returns to block 303.

In contrast, if the corresponding final clusters in the target logical block are set to be read targets on all channels 0 to 15 (Yes in block 408), the self-diagnostic process proceeds to block 409. In block 409, the overall-progress manager 1203 determines whether the processing of the target logical blocks has been completed. To achieve this determination, the overall-progress manager 1203 inquires to the response analyzer 1209 whether command responses (hereinafter referred to as final command responses) have been returned from all channels 0 to 15 in response to accesses to the corresponding final clusters in the target logical block.

If the final command response (success response or error response) fails to be returned from at least one of the channels, the overall-progress manager 1203 determines that the target logical block has failed to be completely processed (No in block 409). In this case, the overall-progress manager 1203 executes block 409 again, for example, a predetermined time later.

On the other hand, if the final command responses have been returned from all channels 0 to 15, the overall-progress manager 1203 determines that the target logical block has been completely processed (that is, self-diagnosis including read has been completed) (Yes in block 409). In this case, the main controller 1202 determines whether the refresh flag is set (block 410). If the refresh flag is set (Yes in block 410), the main controller 1202 registers the logical block ID of the target logical block in the compaction module 1210 as a target logical block for the compaction process (block 411). In block 411, the main controller 1202 clears the refresh flag.

Thus, the main controller 1202 ends the self-diagnostic process for the one logical block. In contrast, if the refresh flag is clear (No in block 410), the main controller 1202 skips block 411 and ends the self-diagnostic process for the one logical block.

The procedure of the self-diagnostic process applied in the embodiment has been described in detail. A patrol process or a refresh process autonomously executed by the NAND controller 2 of the memory device 10 shown in FIG. 1 can be executed similarly to the self-diagnostic process.

As described above, in the NAND controller 2 of the memory device 10 shown in FIG. 1, the command progress manager 1204 manages the command progress state on each channel. Furthermore, ICPCS manager 1211 manages an ICP correction completion state for each logical page in the logical block. According to the memory device 10 in the embodiment comprising the command progress manager 1204 and the ICPCS manager 1211 as described above, a large-volume read process in units of logical blocks can be efficiently executed at high speed.

Furthermore, the embodiment can improve the performance of the self-diagnostic process, patrol process, or refresh process which is essential for ensuring the reliability of the memory device 10 comprising the NAND flash memory 11. Additionally, the embodiment can reduce redundancy in commands reissued when purging or ICP correction is executed, even with a variation in utilization load among the channels. At least one embodiment described above can provide a memory device having multiple channels and which can execute a memory access process in units of blocks at high speed based on management using small-capacity memory areas, as well as a method for accessing a memory in the memory device.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory device comprising:
 a memory configured to be accessed via a plurality of channels;
 a memory interface configured to access the memory via the plurality of channels in parallel based on a plurality of access commands;
 a command generator configured to sequentially issue channel-by-channel access commands to the memory interface in a predetermined access process for accessing the memory in units of blocks;
 a purger configured to return a series of unexecuted already-issued access commands using a purge response if an error occurs in any of memory accesses via the plurality of channels;
 a command progress manager configured to manage command progress in the access commands in the predetermined process based on command progress information and to update the command progress information such that the command progress on each of the plurality of channels returns to a position specified in an oldest access command of a series of the returned access commands issued to the channel, wherein the command generator is further configured to issue the channel-by-channel access commands including the oldest access command to the memory interface based on the updated command progress information; and an overall-progress manager configured to detect an end of a block based on managing overall progress of the access commands on the plurality of channels.

2. The memory device of claim 1, wherein the command generator is further configured to set particular specification information in a final access command if a next access command to be issued is the final access command on a corresponding channel, and the particular specification information is configured to specify that a corresponding command response be returned if the final access command is successfully executed.

3. The memory device of claim 2, wherein the overall-progress manager is configured to detect the end of the block based on determining whether after issuance of the final access commands corresponding to the respective channels, command responses corresponding to the final access commands have been returned.

4. The memory device of claim 1, further comprising:

an interchannel error corrector configured to correct an error location in an erroneous page in the block based on interchannel error correction if an error that is impossible to correct based on an error correction code occurs in a memory access via a first channel of the plurality of channels; and an interchannel error correction state manager configured to manage an interchannel error correction state for each page in the block based on a result of the interchannel error correction, wherein the command progress manager is further configured to update the command progress information such that a command progress position on at least the first channel skips to a leading position of a page next to the erroneous page.

5. The memory device of claim 4, wherein the command progress manager is further configured to update the command progress information such that a next command progress position on a second channel of the plurality of channels also skips to the leading position of the page next to the erroneous page, and the second channel is different from the first channel with the erroneous page set at the command progress position.

6. A method for accessing a memory in units of blocks based on execution of a predetermined access process in a memory device comprising a memory configured to be accessed via a plurality of channels and a memory interface configured to access the memory via the plurality of channels in parallel in accordance with a plurality of access commands, wherein the method comprises:

sequentially issuing channel-by-channel access commands to the memory interface;

returning a series of unexecuted already-issued access commands using a purge response if an error occurs in any of memory accesses via the plurality of channels; and updating command progress information used to manage progress of the access commands in the predetermined process such that the command progress on each of the plurality of channels returns to a position specified in an oldest access command of a series of the returned access commands issued to the channel;

issuing the channel-by-channel access commands including the oldest access command to the memory interface based on the updated command progress information; and detecting an end of a block based on managing in overall progress of the access commands on the plurality of channels.

7. The method of claim 6, further comprising setting particular specification information in a final access command if a next access command to be issued is the final access command on a corresponding channel, and the particular specification information is configured to specify that a corresponding command response be returned if the final access command is successfully executed.

8. The method of claim 7, further comprising determining whether after issuance of the final access commands corresponding to the respective channels, command responses corresponding to the final access commands have been returned, wherein the end of the block is detected based on the determining.

9. The method of claim 6, further comprising:

correcting an error location in an erroneous page in the block based on interchannel error correction if an error that is impossible to correct based on an error correction code occurs in a memory access via a first channel of the plurality of channels;

managing an interchannel error correction state for each page in the block based on a result of the interchannel error correction; and updating the command progress information such that a command progress position on at least the first channel skips to a leading position of a page next to the erroneous page.

10. The method of claim 9, further comprising updating the command progress information such that a next command progress position on a second channel of the plurality of channels also skips to the leading position of the page next to the erroneous page, the second channel being different from the first channel with the erroneous page set at the command progress position.

* * * * *